United States Patent
Lee et al.

(10) Patent No.: US 10,244,488 B2
(45) Date of Patent: Mar. 26, 2019

(54) BODY PRESENCE SENSOR CALIBRATION

(71) Applicant: Intel Corporation, Santa Clara, CA (US)

(72) Inventors: Kwan Ho Lee, Mountain View, CA (US); Yasuharu Omi, Hillsboro, OR (US); Ulun Karacaoglu, San Diego, CA (US); Pronay Dutta, Beaverton, OR (US); Simin Xiong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/499,101

(22) Filed: Sep. 27, 2014

(65) Prior Publication Data

US 2016/0095072 A1 Mar. 31, 2016

(51) Int. Cl.
| | |
|---|---|
| *H04W 52/28* | (2009.01) |
| *H04W 4/02* | (2018.01) |
| *H04W 52/36* | (2009.01) |
| *H04M 1/02* | (2006.01) |

(52) U.S. Cl.
CPC ......... *H04W 52/288* (2013.01); *H04W 4/027* (2013.01); *H04W 52/367* (2013.01); *H04M 1/0214* (2013.01); *H04M 1/0241* (2013.01); *H04W 52/283* (2013.01)

(58) Field of Classification Search
USPC .............................. 455/575.1–575.9; 345/173
See application file for complete search history.

(56) References Cited

U.S. PATENT DOCUMENTS

| | | | |
|---|---|---|---|
| 8,775,103 B1 | 7/2014 | Jayaraj et al. | |
| 8,792,930 B1 | 7/2014 | Gopalkrishnan et al. | |
| 2006/0139034 A1 | 6/2006 | Nevermann | |
| 2008/0278450 A1 | 11/2008 | Lashina | |
| 2010/0080084 A1 | 4/2010 | Chen et al. | |
| 2011/0312349 A1* | 12/2011 | Forutanpour | G06F 1/1626 455/466 |
| 2011/0316840 A1* | 12/2011 | Hirata | G06F 1/3231 345/211 |
| 2012/0077538 A1 | 3/2012 | Yun | |

(Continued)

FOREIGN PATENT DOCUMENTS

EP 2207076 7/2010

OTHER PUBLICATIONS

International search report for PCT application No. PCT/US2015/046911, dated Dec. 3, 2015 (3 pages).

(Continued)

*Primary Examiner* — Steven Kelley
(74) *Attorney, Agent, or Firm* — Barnes & Thornburg LLP (57) ABSTRACT

Technologies for the calibration of a body presence sensor include a mobile computing device configured to calibrate the body presence sensor based on a present physical configuration mode of the mobile computing device. The mobile computing device may be adjustable into multiple physical configuration modes based on the intended use of the mobile computing device. The mobile computing device controls a transmit power level of an associated communication circuit based on whether the body presence sensor detects a body presence within proximity to the mobile computing device.

20 Claims, 5 Drawing Sheets

(56) References Cited

U.S. PATENT DOCUMENTS

| | | | |
|---|---|---|---|
| 2012/0214422 A1* | 8/2012 | Shi | H04B 1/3838 455/67.11 |
| 2012/0315847 A1 | 12/2012 | Li et al. | |
| 2013/0156080 A1* | 6/2013 | Cheng | H01Q 1/243 375/222 |
| 2013/0179108 A1 | 7/2013 | Joseph et al. | |
| 2013/0235083 A1 | 9/2013 | Bao et al. | |
| 2014/0043259 A1* | 2/2014 | Park | G06F 3/0412 345/173 |
| 2014/0070078 A1 | 3/2014 | Land et al. | |

OTHER PUBLICATIONS

Written opinion for PCT application No. PCT/US2015/046911, dated Dec. 3, 2015 (9 pages).
Office Action and English Translation for Taiwanese Patent Application No. 104127519, dated Jul. 11, 2016, 29 pages.
Office Action dated Apr. 3, 2018 for Japanese patent Application No. 2017-516409 with translation, 4 pages.
Extended European Search report dated May 28, 2018 for European patent Application No. 15844339.0-1219, 9 pages.

\* cited by examiner

BODY PRESENCE SENSOR CALIBRATION

BACKGROUND

Typical computing devices have many features, including hardware, firmware, and software features. Certain features, such as wireless communication circuits, may output or control the output of radio frequency (RF) energy emissions from the computing devices. Computing device manufacturers generally, and mobile computing device manufacturers in particular, prefer higher RF energy output levels to increase the performance of the computing device (e.g., increased upload/download performance levels, fewer dropped connections, etc.). However, under certain conditions, the output level of the RF energy being emitted may need to be lowered. One such condition is the proximity of the RF energy emitting feature of the computing device to a body of a user of the mobile computing device. For example, the Federal Communications Commission (FCC) has imposed a specific absorption rate (SAR) requirement (i.e., an RF energy emission limit) of 1.6 W/Kg due to health concerns over the RF emissions being absorbed by the body.

A common practice adopted by mobile computing device manufacturers includes relying on sensor data to determine the proximity of the user's body to the mobile computing device and adjusting the RF energy output levels accordingly. However, certain mobile computing devices are capable of operating in multiple physical configuration modes, which may result in the sensor data and/or threshold pertaining thereto, to be inaccurate, which in turn, may cause the RF energy output levels to be adjusted improperly. Such an improper adjustment could result in the mobile computing device operating in a particular physical configuration mode at a less than optimal performance level, or worse, could result in the mobile computing device operating in violation of FCC regulations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
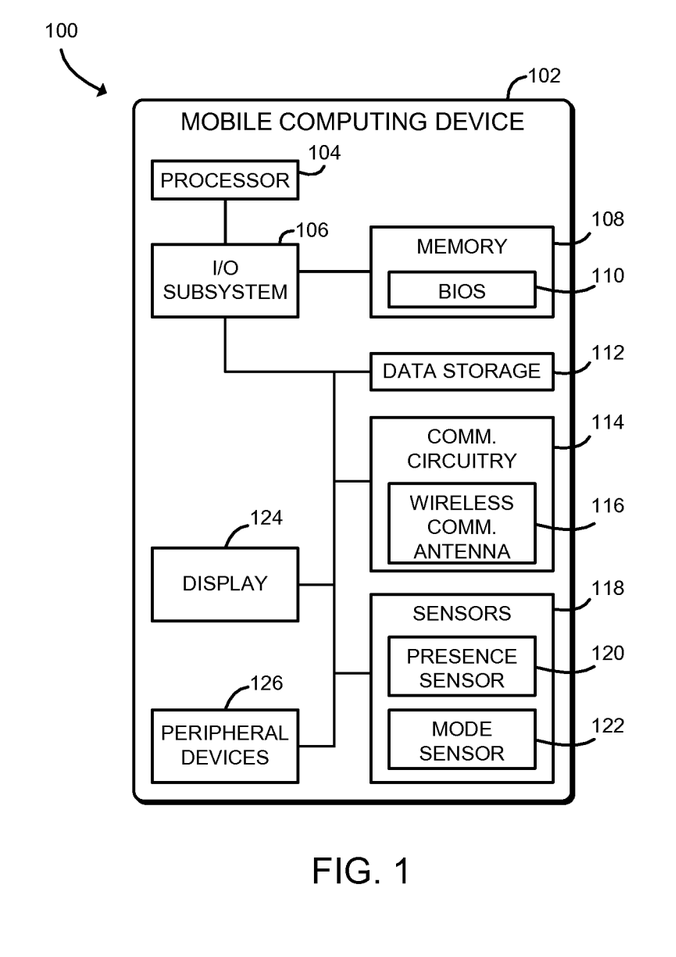
FIG. 1 is a simplified block diagram of at least one embodiment of a system for body presence sensor calibration.

Referring now to FIG. 1, an illustrative embodiment of a system 100 for body presence sensor calibration includes a mobile computing device 102 having communication circuitry 114, a body presence sensor 120, and a physical configuration mode detection sensor 122. In use, as discussed in more detail below, the mobile computing device 102 is configured to control a power mode of the communication circuitry 114 based on whether a presence of a user is detected within close proximity to the mobile computing device 102. To do so, the mobile computing device 102 monitors sensor data generated by the body presence sensor 120, which is indicative of a body presence of a user of the mobile computing device 102. If a body presence is detected, the mobile computing device 102 adjusts the power mode of the communication circuitry 114 as discussed in more detail below.

To improve the accuracy of the power mode adjustment of the communication circuitry 114, the mobile computing device 102 is configured to calibrate the body presence sensor 120 based on a present physical configuration mode of the mobile computing device 102. That is, as discussed further below, the mobile computing device 102 is adjustable into one of a number of different physical configuration modes. Example physical configuration modes include a tent mode, a tablet mode, and/or a clamshell mode. Of course, the mobile computing device 102 may be configurable into other physical configuration modes in other embodiments. Regardless, each physical configuration mode of the mobile computing device 102 may require different thresholds for detecting whether the body presence of the user is such that an adjustment to a feature of the system 100 is required, such as a reduction in the RF energy output level of the communication circuitry 114. As such, the physical configuration mode detection sensor 122 is configured to generate sensor data indicative of the present physical configuration mode of the mobile computing device 102 or from which the present physical configuration mode can be determined. Based on the present physical configuration mode, the mobile computing device 102 calibrates the body presence sensor 120. It should be appreciated that by calibrating the body presence sensor 120 based on the present physical configuration mode, the risk of the mobile computing device 102 operating at a lower than normal RF energy output level unnecessarily (i.e., operating at a less than optimal performance level), or at a normal power level when the mobile computing device 102 should otherwise be operating at the lower than normal RF energy output level (i.e., in violation of certain FCC regulations), may be reduced.

The mobile computing device 102 may be embodied as any type of computation or computer device configurable into multiple physical configuration modes and capable of performing the functions described herein, including, without limitation, a mobile computer, a smartphone, a tablet computer, a laptop computer, a convertible laptop computer, a notebook computer, a wearable computing device, a multiprocessor system, a mobile internet device, a telephony device, a consumer electronic device, and/or other portable computing device. As shown in FIG. 1, the mobile computing device 102 illustratively includes a processor 104, an input/output (I/O) subsystem 106, a memory 108, a data storage device 112, a communication circuitry 114, one or more sensors 118, a display 124, and one or more peripheral devices 126. In some embodiments, several of the foregoing components may be incorporated on a motherboard of the mobile computing device 102, while other components may be communicatively coupled to the motherboard via, for example, a peripheral port. Furthermore, it should be appreciated that the mobile computing device 102 may include other and/or additional components, such as those commonly found in a computer and/or computing device in other embodiments. Additionally, in some embodiments, one or more of the illustrative components may be incorporated in, or otherwise form a portion of, another component. For example, the memory 108, or portions thereof, may be incorporated in the processor 104 in some embodiments.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the memory 108 may be embodied as any type of volatile or non-volatile memory or data storage capable of performing the functions described herein. In operation, the memory 108 may store various data and software used during operation of the mobile computing device 102 such as operating systems, applications, programs, libraries, and drivers. In the illustrated embodiment of the mobile computing device 102, a basic input/output system (BIOS) 110 may reside in memory 108 and include instructions (e.g., a BIOS driver used during booting of the mobile computing device 102) to initialize the mobile computing device 102 during the boot process. The memory 108 is communicatively coupled to the processor 104 via the I/O subsystem 106, which may be embodied as circuitry and/or components to facilitate input/output operations with the processor 104, the memory 108, and other components of the mobile computing device 102. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 104, the memory 108, and other components of the mobile computing device 102, on a single integrated circuit chip.

The data storage device 112 may be embodied as any type of device or devices configured for short-term or long-term storage of data such as, for example, memory devices and circuits, memory cards, hard disk drives, solid-state drives, or other data storage devices. In use, the data storage device 112 may store software or firmware used to enable various platform features of the mobile computing device 102.

The communication circuitry 114 of the mobile computing device 102 may be embodied as any communication circuit, device, or collection thereof, capable of enabling communications between the mobile computing device 102 and other remote devices over a network. The communication circuitry 114 may be configured to use any one or more communication technology (e.g., wired or wireless communications) and associated protocols (e.g., Ethernet, Bluetooth®, Wi-Fi®, WiMAX, etc.) to effect such communication. In an illustrative embodiment of the mobile computing device 102, the communication circuitry 114 includes a wireless communication antenna 116, such as wireless wide area network (WWAN) antenna, which is capable of transmitting various levels of RF energy.

The sensors 118 include the body presence sensor 120 and the physical configuration mode detection sensor 122 discussed above; however, it should be noted that additional and/or alternative sensors may be included in other embodiments. The body presence sensor 120 may be embodied as any type of sensor capable of sensing or detecting the presence of a body of a user within proximity of the mobile computing device 102. In the illustrative embodiment, the body presence sensor 120 is embodied as a capacitive sensor configured to monitor capacitive values to detect an environmental change, which may be based on self-capacitance or mutual capacitance, to detect the presence of a body. Of course, in other embodiments, the body presence sensor 120 may be embodied as another type and/or use other technology to sense the presence of the user's body in proximity to the mobile computing device 102. In some embodiments, the body presence sensor 120 may be located near the wireless communication antenna 116 to detect the body presence of the user of the mobile computing device 102 relative to the wireless communication antenna 116.

Similarly, the physical configuration mode detection sensor 122 may be embodied as any type of sensor capable of detecting a change in the physical configuration mode of the mobile computing device 102 and/or generating data indicative of the present physical configuration mode of the mobile computing device 102. For example, in the illustrative embodiment, the physical configuration mode detection sensor 122 is embodied as an angle sensor configured to generate sensor data indicative of an angle defined between a lid 202 and a base 206 of the mobile computing device 102 (see FIGS. 2-5). Based on the defined angle between the lid 202 and base 206, the mobile computing device 102 can determine, or otherwise infer, the present physical configuration mode (e.g., tent mode, tablet mode, or clamshell mode) of the mobile computing device 102 as discussed in detail below.

The display 124 of the mobile computing device 102 may be embodied as any type of display capable of displaying digital information such as a liquid crystal display (LCD), a light emitting diode (LED), a plasma display, a cathode ray tube (CRT), or other type of display device. In some embodiments, the display 124 may be coupled to a touch screen to allow the user to interact with the mobile computing device 102.

The peripheral devices 126 of the mobile computing device 102 may include any number of peripheral or interface devices. For example, the peripheral devices 126 may include a display, a keyboard, a mouse, one or more data storage devices such as an internal or external hard drive, and/or other peripheral devices. The particular devices included in the peripheral devices 126 may depend upon, for example, the intended use of the mobile computing device 102. The peripheral devices 126 are communicatively coupled to the I/O subsystem 106 via a number of signal paths thereby allowing the I/O subsystem 106 and/or processor 104 to receive inputs from and send outputs to the peripheral devices 126.

As discussed above, the mobile computing device 102 is adjustable or configurable into one of several different physical configuration modes. For example, the mobile computing device 102 is shown in several illustrative physical configuration modes in FIGS. 2-5. It should be appreciated, however, that some embodiments of the mobile computing device 102 may contain fewer or more physical configuration modes, or alternative modes, than those illustrated herein.

Figure 2:
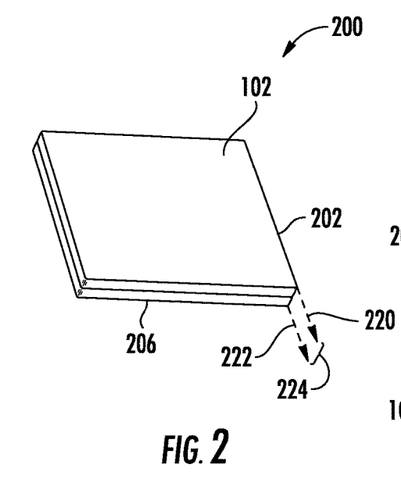
FIG. 2 is an illustration of a physical configuration mode of a mobile computing device of the system of FIG. 1 in a closed mode.
Figure 3:
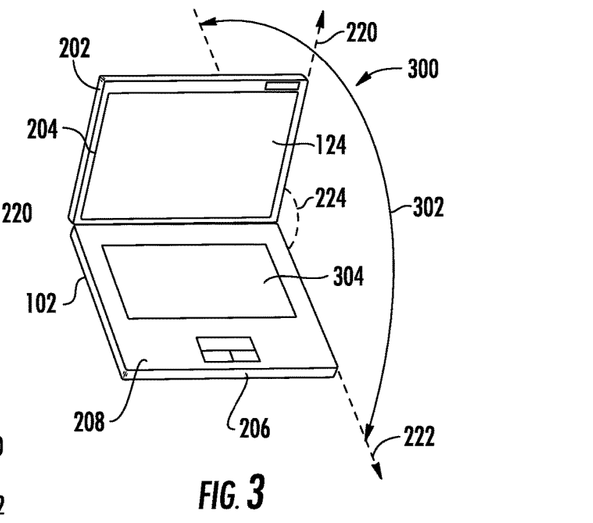
FIG. 3 is an illustration of another physical configuration mode of the mobile computing device of the system of FIG. 1 in a clamshell mode.

Referring to FIG. 2, in some embodiments, the mobile computing device 102 may be adjusted or configured into a closed mode 200. As shown, when in the closed mode 200, a lid interfacing side 204 (illustrated to include the display 124 as shown in FIG. 3) of the lid 202 of the mobile computing device 102 abuts or confronts a base interfacing side 208 (illustrated to include a keyboard 304 as shown in FIG. 3) of a base 206 of the mobile computing device 102. In particular, the lid 202 defines a lid axis 220, and the base 206 defines a base axis 222, which is substantially parallel to the lid axis 220 when the mobile computing device 102 is in the closed mode 200. That is, the lid axis 220 and the base axis 222 define a lid-to-base angle 224 that is substantially zero when the mobile computing device 102 is configured in the closed mode 200 as shown in FIG. 2. Typically, when the mobile computing device 102 is in the closed mode 200, the mobile computing device 102 is in standby, powered off, or being operated by a user via an external device (not shown), such as a docking station, for example.

Referring now to FIG. 3, in some embodiments, the mobile computing device 102 may also be adjusted or configured into a clamshell mode 300. As shown, when in the clamshell mode 300, the mobile computing device 102 is opened such that the lid interfacing side 204 of the lid 202 is rotated away from the base interfacing side 208 of the base 206 to allow a user to view each interfacing side 204, 208 of the mobile computing device 102. In the illustrative embodiment of FIG. 3, the lid-to-base angle 224 defined by the lid axis 220 and the base axis 222 is about 90 degrees. However, the mobile computing device 102 may be considered to be configured in the clamshell mode when the lid-to-base angle 224 is greater than a minimum threshold (e.g., greater than zero degrees) and equal to or less than a maximum threshold (e.g., 180 degrees as shown by angle reference 302). Of course, in other embodiments, the particular range of lid-to-base angles that define the clamshell mode 300 may vary based on various criteria, such as the design or intended use of the mobile computing device 102.

Figure 4:
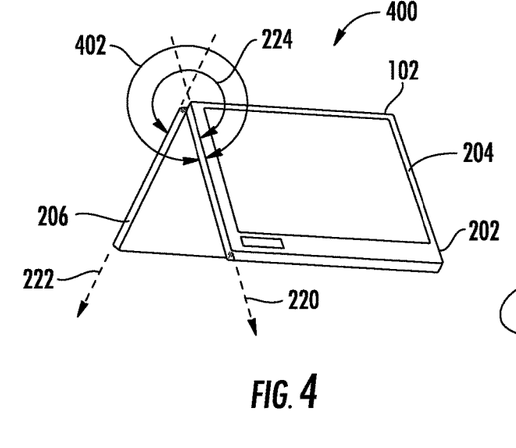
FIG. 4 is an illustration of another physical configuration mode of the mobile computing device of the system of FIG. 1 in a tent mode.

Referring now to FIG. 4, in some embodiments, the mobile computing device 102 may also be adjusted or configured into a tent mode 400. It should be noted that the mobile computing device 102 has been rotated generally 180° about a vertical axis between FIG. 3 and FIG. 4 to provide clarity of the tent mode 400 embodiment (i.e., the lid interfacing side 204 of the lid 202 facing the user). It should further be appreciated that the display 124 may invert when the mobile computing device 102 is placed in the tent mode 400 to provide proper viewing to a user. As shown in FIG. 4, in the tent mode 400, the lid 202 of the mobile computing device 102 has been rotated from the base 206 even further relative to the clamshell mode 300 and generally resembles a tent from a side profile. In the illustrative embodiment of FIG. 4, the lid-to-base angle 224 defined by the lid axis 220 and the base axis 222 is about 270 degrees. However, the mobile computing device 102 may be considered to be configured in the tent mode when the lid-to-base angle 224 is greater than a minimum threshold (e.g., greater than 180 degrees) and equal to or less than a maximum threshold (e.g., 360 degrees as shown by angle reference 402). Of course, in other embodiments, the particular range of lid-to-base angles that defines the tent mode 400 may vary based on various criteria, such as the design or intended use of the mobile computing device 102. Additionally, it should be appreciated that the maximum threshold angle of the lid-to-base angle 224 that defines the tent mode 400 may be dependent upon the thickness of the lid 202 and/or base 206 of the mobile computing device 102.

Figure 5:
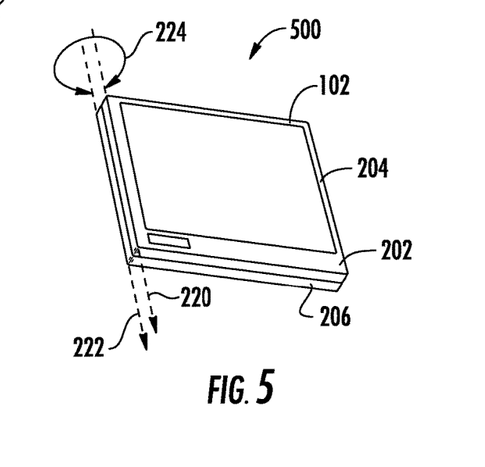
FIG. 5 is an illustration of another physical configuration mode of the mobile computing device of the system of FIG. 1 in a tablet mode.

Referring now to FIG. 5, in some embodiments, the mobile computing device 102 may also be adjusted or configured into a tablet mode 500. As shown, in the tablet mode 500, the lid 202 of the mobile computing device 102 has been rotated relative to the base 206 such that the lid 202 abuts or confronts the base 206. As such, the mobile computing device 102 generally resembles a tablet computer while in the tablet mode 500. In the illustrative embodiment of FIG. 5, the lid-to-base angle 224 defined by the lid axis 220 and the base axis 222 is about 360 degrees. However, the mobile computing device 102 may be considered to be configured in the tablet mode 500 when the lid-to-base angle 224 is greater than a minimum threshold (e.g., greater than 300 degrees). Of course, the particular minimum lid-to-base angle that defines the tablet mode 500 may be different in other embodiments based on various criteria, such as the design or intended use of the mobile computing device 102.

Additionally, it should be appreciated that the minimum threshold angle of the lid-to-base angle 224 that defines the tablet mode 500 may be dependent upon the thickness of the lid 202 and/or base 206 of the mobile computing device 102.

Figure 6:
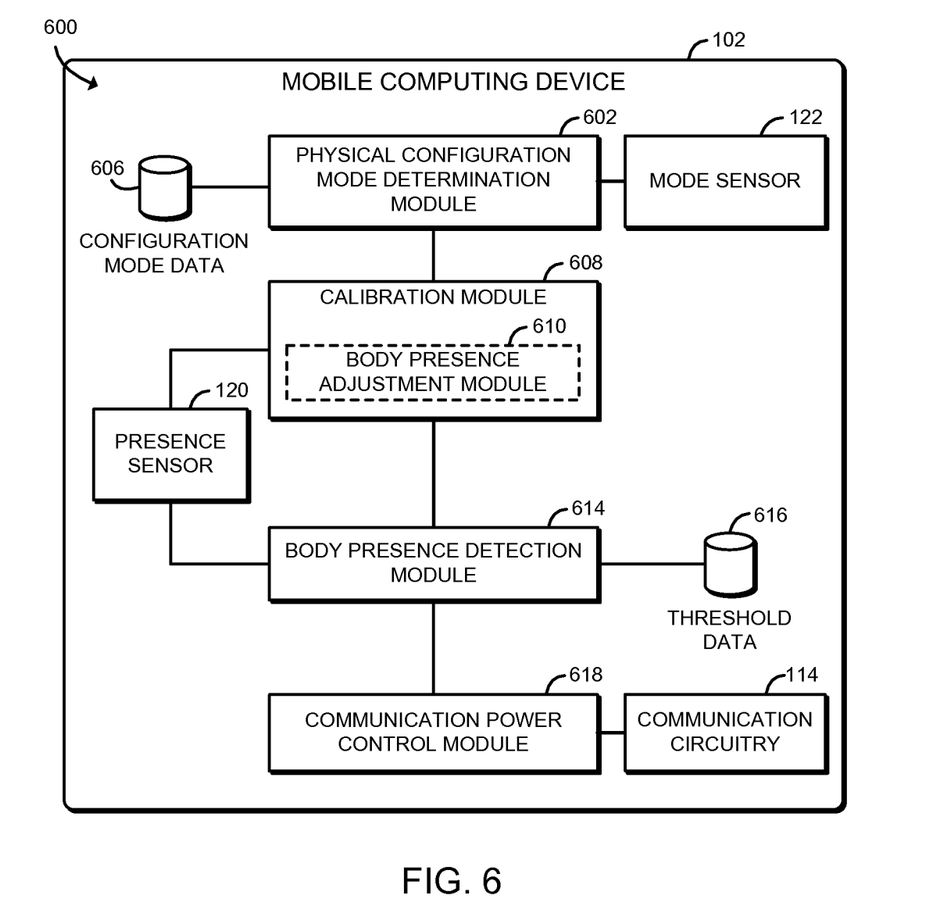
FIG. 6 is a simplified block diagram of at least one embodiment of an environment that may be established by the mobile computing device of the system of FIG. 1.

Referring now to FIG. 6, in the illustrative embodiment, the mobile computing device 102 establishes an environment 600 during operation. The illustrative environment 600 includes a physical configuration mode determination module 602, a calibration module 608, a body presence adjustment module 610, a body presence detection module 614, and a communication power control module 618. The various modules of the environment 600 may be embodied as hardware, firmware, software, or a combination thereof. For example, each of the modules, logic, and other components of the environment 600 may form a portion of, or otherwise be established by, the processor 104 or other hardware components of the mobile computing device 102.

The physical configuration mode determination module 602 is configured to determine a present physical configuration mode of the mobile computing device 102 based on the sensor data generated by the physical configuration mode detection sensor 122 (e.g., sensor data indicative of the lid-to-base angle 224). In the illustrative embodiment, the physical configuration mode determination module 602 may determine the present physical configuration mode of the mobile computing device 102 in response to detection of a change in the physical configuration mode. For example, the physical configuration mode determination module 602 may monitor the sensor data generated by the physical configuration mode detection sensor 122 to determine a change in the physical configuration mode of the mobile computing device 102 (e.g., a change in the lid-to-base angle 224) and, in response to the detection of the change, determine the new physical configuration mode. Additionally, in some embodiments, the physical configuration mode determination module 602 may detect the change in the physical configuration mode of the mobile computing device 102 in response to a power-on or other event of the mobile computing device 102. For example, the mobile computing device 102 may determine the present physical configuration mode of the mobile computing device 102 in response to the device 102 being turned on.

In some embodiments, the physical configuration mode determination module 602 may also determine the present physical configuration mode of the mobile computing device 102 based on configuration mode data 606. The configuration mode data 606 may include, for example, one or more thresholds that may define bounds to distinguish between physical configuration modes. For example, the configuration mode data 606 may define the particular lid-to-base angle ranges that define the various physical configuration modes (e.g., closed, clamshell, tent, tablet, etc.) of the mobile computing device 102.

The calibration module 608 is configured to calibrate the body presence sensor 120 of the mobile computing device 102 based on the present physical configuration mode of the mobile computing device 102, as determined by the physical configuration mode determination module 602. Such calibration may occur in each of the various physical configuration modes of the mobile computing device 102 or only a subset thereof. For example, in some embodiments, the calibration module 608 may calibrate the body presence sensor 120 only in response to the present physical configuration mode being one in which the user's body is likely to be in near proximity to the mobile computing device 102, such as the tablet mode and the tent mode. For example, due to the body presence sensor 120 being located in the mobile computing device 102 at a generally sufficient distance from the base 206, and therefore the body of the user, in clamshell mode as illustrated in FIG. 3, there may be no regulation requirement regarding the RF output of the communication circuitry 114. In such cases, the body presence sensor 120 may be turned off or the data received therefrom may be otherwise ignored.

The body presence detection module 614 is configured to detect a presence of a body of a user of the mobile computing device 102. The body presence detection module 614 may detect the body presence based on sensor data received from the body presence sensor 120, which is indicative of the presence of a body (i.e., a user) at a certain distance from the body presence sensor 120 (e.g., less than 1 inch).

In some embodiments, the calibration module 608 may include the body presence adjustment module 610, which is configured to adjust the calibration of the body presence sensor 120 based on detection of a body presence by the body presence sensor 120. For example, the calibration data or magnitude of calibration may be offset or otherwise adjusted to account for the presence of the user's body near the mobile computing device 102 during the calibration procedure. In such embodiments, the body presence adjustment module 610 may receive data indicative of the body presence from the body presence detection module 614. In some embodiments, the body presence may be determined to be within a proximity threshold when the body presence is less than a maximum distance threshold from the body presence sensor 120. In other embodiments, the body presence may be determined to be within the proximity threshold when the body presence is greater than a minimum distance threshold from the body presence sensor 120 and less than a maximum distance threshold from the body presence sensor 120. For example, in an illustrative embodiment, the minimum threshold is defined as 10 millimeters and the maximum threshold is defined as 20 millimeters. Additionally, in some embodiments, the particular ranges and values defining the proximity threshold may vary based on the present physical configuration mode of the mobile computing device 102. Such various ranges and values may be stored in threshold data 616 and accessed by the communication power control module 618 to retrieve the appropriate thresholds based on the present physical configuration mode of the mobile computing device 102.

The communication power control module 618 is configured to control the transmit power of the communication circuitry 114. In particular, the communication power control module 618 controls the wireless transmit power of the communication circuitry 114 based on the presence, or lack thereof, of the user's body within a proximity to the mobile computing device 102. For example, the communication power control module 618 may reduce the transmit power level of the communication circuitry 114 from a normal transmit power level to a lower transmit power level in response to a determination that a body presence is within the proximity threshold of the mobile computing device 102 as determined by the body presence detection module 614.

Figure 7:
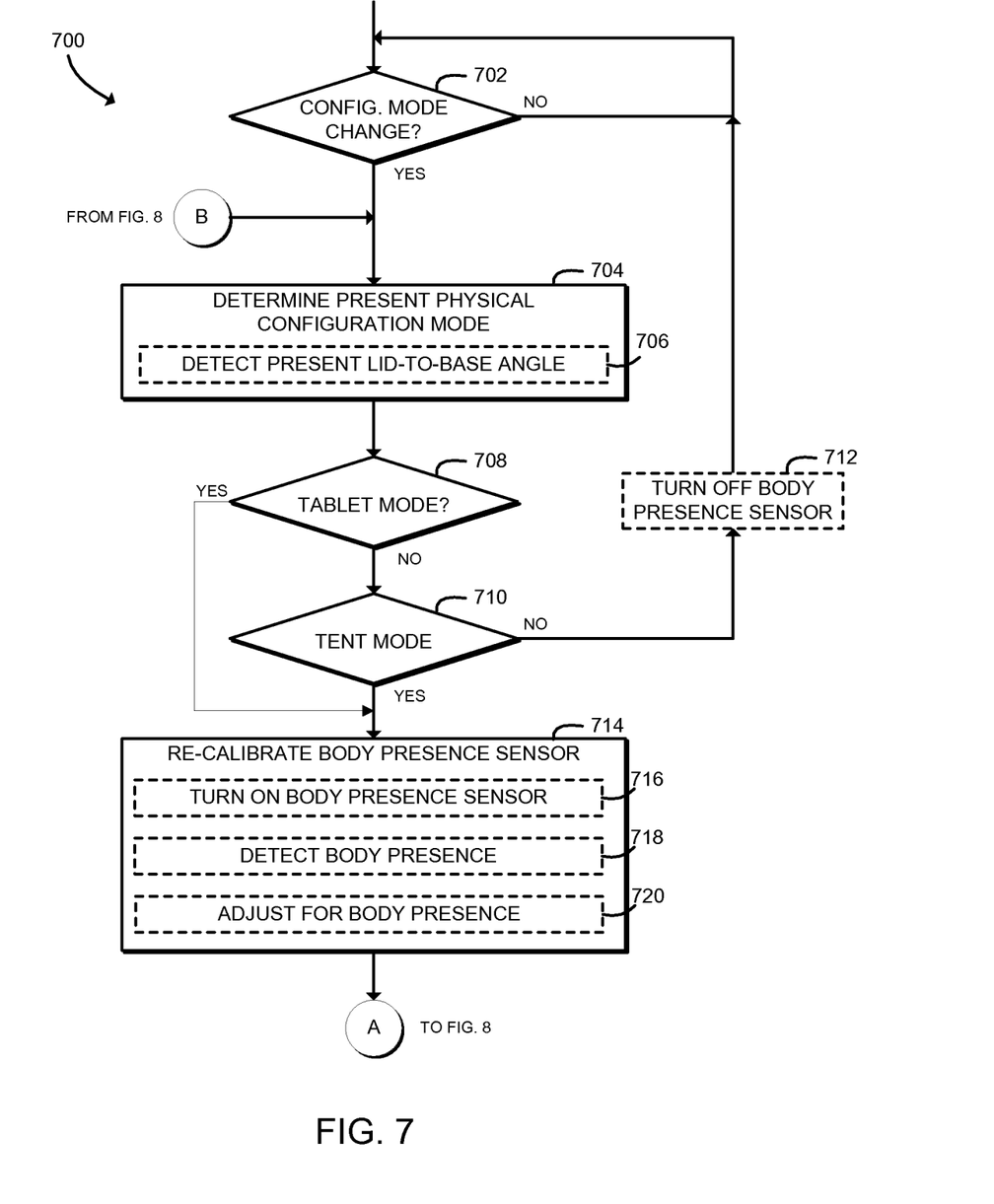
FIGS. 7 and 8 are a simplified flow diagram of at least one embodiment of a method for body presence sensor calibration that may be executed by the mobile computing device of the system of FIGS. 1 and 6.
Figure 8:
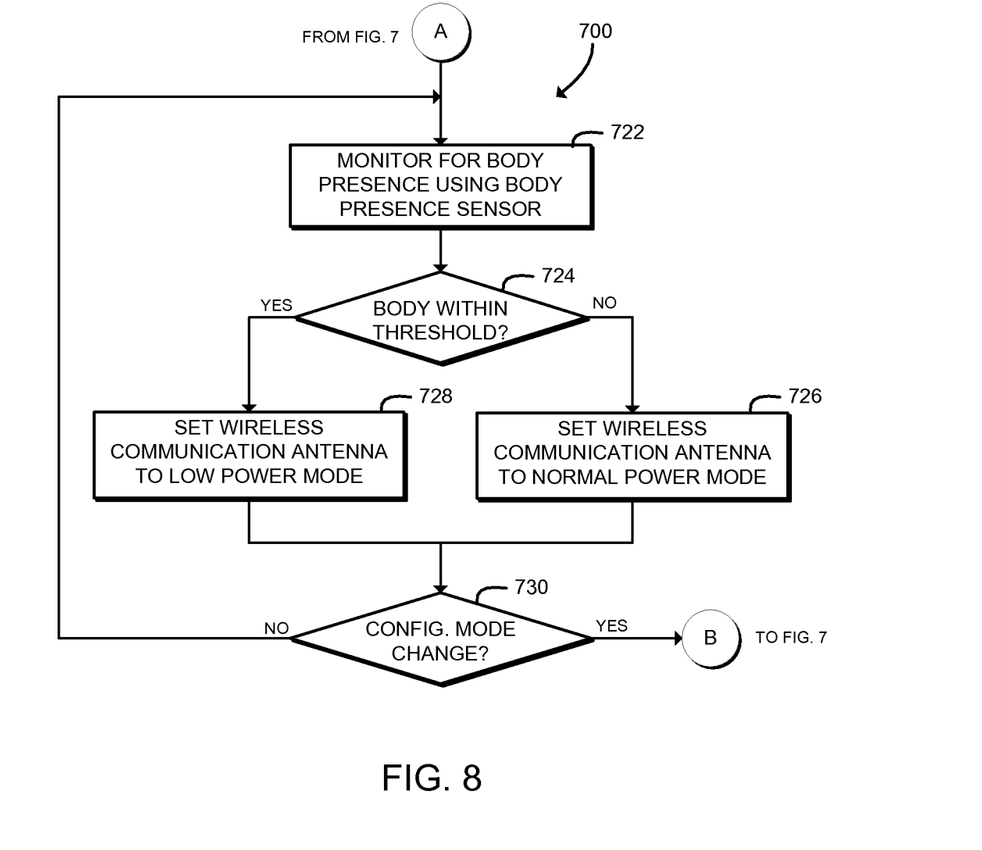

Referring now to FIGS. 7 and 8, in use, the mobile computing device 102 may execute a method 700 for calibrating the body presence sensor 120 and controlling a transmit power level of the communication circuitry 114 (e.g., the transmit power level of a wireless communication portion of the communication circuitry 114). The method 700 begins in block 702, in which the mobile computing device 102 determines whether a change in the physical configuration mode of the mobile computing device 102 has occurred. If not, the method 700 loops back to block 702 to continue monitoring for a physical configuration mode change. If a configuration mode change has been detected, the method 700 advances to block 704.

In block 704, the mobile computing device 102 determines the present physical configuration mode of the device 102. To do so, the mobile computing device 102 may monitor the sensor data generated by the physical configuration mode detection sensor 122 and determine the present physical configuration mode of the mobile computing device 102 based of such sensor data as discussed above. For example, in embodiments in which the physical configuration mode detection sensor 122 is embodied as an angle sensor, the mobile computing device 102 may determine the present physical configuration mode of the device 102 based on the angle data generated by the physical configuration mode detection sensor 122, which is indicative of the lid-to-base angle 244 discussed above. To do so, in some embodiments, the mobile computing device 102 may detect a present lid-to-base angle in block 706.

In block 708, the mobile computing device 102 determines whether the present physical configuration mode of the device 102 is a tablet mode. If the mobile computing device 102 is determined to be in the tablet mode, method 700 advances to block 714 discussed below. If, however, the mobile computing device 102 is not in the tablet mode, the method 700 advances to block 710. In block 710, the mobile computing device 102 determines whether the present physical configuration mode of the device 102 is a tent mode. If the mobile computing device 102 is determined not to be in the tent mode, the method 700 advances to block 712 in some embodiments. In block 712, the mobile computing device 102 turns the body presence sensor 120 off before looping back to block 702 to continue monitoring for a change in the physical configuration mode of the mobile computing device 102. Alternatively, in other embodiments, the sensor data generated by the body presence sensor 120 may be simply ignored in block 712. Regardless, the method 700 subsequently loops back to block 702 in which the mobile computing device 102 continues monitoring for a change in the physical configuration mode. Although the determinations performed in the blocks 708 and 710 have been presented in FIG. 7 in a particular order, it should be appreciated that such determinations may occur in any order or contemporaneously with each other.

Referring back to blocks 708 and 710, if the mobile computing device 102 determines that the present physical configuration mode is either tablet mode or tent mode, the method 700 advances to block 714. In block 714, the mobile computing device 102 calibrates, or otherwise recalibrates, the body presence sensor 120. As discussed above, the mobile computing device 102 calibrates the body presence sensor 120 based on the present physical configuration mode (e.g., tablet mode or tent mode). To do so, in some embodiments, mobile computing device 102 may turn on the body presence sensor 120 in block 716 (e.g., if the body presence sensor 120 has previously been turned off in block 712). Additionally, as discussed above in regard to the body presence adjustment module 610, the mobile computing device 102 may be configured to detect the presence of a body of a user within a proximity threshold of the mobile computing device 102 in block 718 and, if a body presence is detected, adjust the calibration of the body presence sensor 120 to account for the body presence during the calibration process in block 720. The calibration of the body presence sensor 120 based on the present physical configuration mode of the mobile computing device 102 may be include any type of calibration process depending on, for example, the type of body presence sensor used, the associated regulations, and/or other criteria. For example, the sensitivity, detection rage, or other characteristic of the body presence sensor 120 may be calibrated in block 714. Additionally, it should be appreciated that the calibration of the body presence sensor 120 may be different between the tablet mode and tent mode, in some embodiments.

After the body presence sensor 120 has been calibrated in block 714, the method 700 advances to block 722 of FIG. 8. In block 722, the mobile computing device 102 monitors for a presence of a body of a user within proximity of the mobile computing device 102. As discussed above, the mobile computing device 102 detects the presence of a user's body based on the sensor data generated by the calibrated body presence sensor 120. In block 724, the mobile computing device 102 determines whether the body presence is within a proximity threshold of the mobile computing device 102 as discussed above in regard to the communication power control module 618 of FIG. 6. If not, the method 700 advances to block 726 in which the transmit power (e.g., wireless transmit power) of the communication circuitry 114 is set to a normal or "high" power mode. The method 700 subsequently advances to block 730 in which the mobile computing device 102 again monitors for a change in the physical configuration mode. If a change is detected, the method 700 loops back to block 704 of FIG. 7 in which the mobile computing device 102 determines the present physical configuration mode. If no change is detected, however, the method 700 loops back to block 722 in which the mobile computing device 102 continues monitoring for a body presence within a proximity threshold of the device 102.

Referring back to block 724, if mobile computing device 102 determines that the body presence is within the proximity threshold, the method 700 advances to block 726. In block 728, the transmit power (e.g., wireless transmit power) of the communication circuitry 114 is set to a "low" power mode. For example, the transmit power of the communication circuitry 114 may be set to a power level that is less than the power level set in block 726 and/or defined by a transmit power regulation, such as a Federal Communications Commission (FCC) regulation. In this way, the transmit power level of the communication circuitry 114 may be controlled based on the present physical configuration mode of the mobile computing device 102 to improve the communication capability of the mobile computing device 102 while satisfying related transmit power regulations or limits.

EXAMPLES

Illustrative examples of the technologies disclosed herein are provided below. An embodiment of the technologies may include any one or more, and any combination of, the examples described below.

Example 1 includes a mobile computing device comprising a mode detection sensor to generate sensor data indicative of a change of a physical configuration mode of the mobile computing device; a physical configuration mode determination module to determine a present physical configuration mode of the mobile computing device in response to detection of the change of the physical configuration mode; a body presence sensor to generate sensor data indicative of a presence of a body of user within a proximity of the mobile computing device; and a calibration module to calibrate the body presence sensor based on the present physical configuration mode.

Example 2 includes the subject matter of Example 1, and wherein to calibrate the body presence sensor includes to turn off the body presence sensor in response to a determination that the present physical configuration mode is a clamshell mode.

Example 3 includes the subject matter of any of Examples 1 and 2, and further including a body presence detection module to detect a body presence of a user within a proximity of the mobile computing device, wherein the calibration module is to calibrate the body presence sensor based on the present physical configuration mode and the detection of the body presence of the user within the proximity of the mobile computing device.

Example 4 includes the subject matter of any of Examples 1-3, and further including a body presence detection module to detect a body presence of a user within a proximity of the mobile computing device; and a communication power control module to determine, subsequent to the calibration of the body presence sensor, a maximum transmit power level of a wireless communication circuit in response to the detection of the body presence of the user within a proximity of the mobile computing device; and control a transmit power level of the wireless communication circuit based on the maximum transmit power level.

Example 5 includes the subject matter of any of Examples 1-4, and wherein to control the transmit power level of the wireless communication circuit comprises to reduce the transmit power level of the wireless communication circuit from a first transmit power level to a second transmit power level in response to the detection of the body presence of the user within a proximity threshold of the mobile computing device, wherein the second transmit power level is less than the first transmit power level.

Example 6 includes the subject matter of any of Examples 1-5, and wherein to determine whether the body presence is within the proximity threshold comprises to determine whether the body presence is less than a maximum distance threshold from the body presence sensor.

Example 7 includes the subject matter of any of Examples 1-6, and wherein to determine whether the body presence is within the proximity threshold comprises to determine whether the body presence is greater that a minimum distance threshold from the body presence sensor and less than the maximum distance threshold from the body presence sensor.

Example 8 includes the subject matter of any of Examples 1-7, and wherein the wireless communication circuit includes a wireless wide area network (WWAN) antenna.

Example 9 includes the subject matter of any of Examples 1-8, and wherein to detect the change of the physical configuration mode comprises to detect a change of the physical configuration mode of the mobile computing device in response to the detection of a power-on event of the mobile computing device.

Example 10 includes the subject matter of any of Examples 1-9, and wherein to detect the change of the physical configuration mode comprises to detect a change of the physical configuration mode based on a sensor signal generated by an angle sensor of the mobile computing device, the sensor signal indicative of an angle defined between a lid of the mobile computing device and a base of the mobile computing device.

Example 11 includes the subject matter of any of Examples 1-10, and wherein to determine the present physical configuration mode comprises to determine whether the present physical configuration mode of the mobile computing device is a tablet mode, a tent mode, or a clamshell mode.

Example 12 includes the subject matter of any of Examples 1-11, and wherein to determine whether the present physical configuration mode is the tablet mode comprises to determine whether an angle defined between a lid of the mobile computing device and a base of the mobile computing device is equal to a first threshold.

Example 13 includes the subject matter of any of Examples 1-12, and wherein to determine whether the present physical configuration mode is the tent mode comprises to determine whether the angle defined between the lid and the base is less than the first threshold and greater than a second threshold.

Example 14 includes the subject matter of any of Examples 1-13, and wherein to determine whether the present physical configuration mode is the clamshell mode comprises to determine whether the angle defined between the lid and the base is less than or equal to the second threshold.

Example 15 includes the subject matter of any of Examples 1-14, and wherein the first threshold is equal to about 360° and the second threshold is equal to about 180°.

Example 16 includes the subject matter of any of Examples 1-15, and wherein the body presence sensor comprises a capacitive sensor.

Example 17 includes a method comprising detecting, by a mode detection sensor of the mobile computing device, a change of a physical configuration mode of the mobile computing device; determining, by the mobile computing device, a present physical configuration mode of the mobile computing device in response to detecting the change of the physical configuration mode; and calibrating the body presence sensor of the mobile computing device based on the present physical configuration mode.

Example 18 includes the subject matter of Example 17, and further including turning off the body presence sensor in response to determining the present physical configuration mode is a clamshell mode.

Example 19 includes the subject matter of any of Examples 17 and 18, and further including detecting, by the body presence sensor, a body presence of a user within a proximity of the mobile computing device; wherein calibrating the body presence sensor comprises recalibrating the body presence sensor based on the present physical configuration mode and detection of the body presence.

Example 20 includes the subject matter of any of Examples 17-19, and further including detecting, by the body presence sensor and subsequent to calibrating the body presence sensor, a body presence of a user within a proximity of the mobile computing device; determining a maximum transmit power level of a wireless communication circuit in response to detecting the body presence of the user; and controlling a transmit power level of the wireless communication circuit based on the maximum transmit power level.

Example 21 includes the subject matter of any of Examples 17-20, and further including determining whether the body presence is within a proximity threshold, wherein controlling the transmit power level of the wireless communication circuit comprises reducing the transmit power level of the wireless communication circuit from a first transmit power level to a second transmit power level in response to determining the body presence being within the proximity threshold, wherein the second transmit power level is less than the first transmit power level.

Example 22 includes the subject matter of any of Examples 17-21, and wherein determining whether the body presence is within the proximity threshold comprises determining whether the body presence is less than a maximum distance threshold from the body presence sensor.

Example 23 includes the subject matter of any of Examples 17-22, and wherein determining whether the body presence is within the proximity threshold comprises determining whether the body presence is greater that a minimum distance threshold from the body presence sensor and less than the maximum distance threshold from the body presence sensor.

Example 24 includes the subject matter of any of Examples 17-23, and wherein the wireless communication circuit includes a wireless wide area network (WWAN) antenna.

Example 25 includes the subject matter of any of Examples 17-24, and wherein detecting the change of the physical configuration mode comprises detecting a change of the physical configuration mode of the mobile computing device in response to detecting of a power-on event of the mobile computing device.

Example 26 includes the subject matter of any of Examples 17-25, and wherein detecting the change of the physical configuration mode comprises detecting a change of the physical configuration mode based on a sensor signal generated by an angle sensor of the mobile computing device, wherein the sensor signal is indicative of an angle defined between a lid of the mobile computing device and a base of the mobile computing device.

Example 27 includes the subject matter of any of Examples 17-26, and wherein determining the present physical configuration mode comprises determining whether the present physical configuration mode of the mobile computing device is a tablet mode, a tent mode, or a clamshell mode.

Example 28 includes the subject matter of any of Examples 17-27, and wherein determining whether the present physical configuration mode is the tablet mode comprises determining whether an angle defined between a lid of the mobile computing device and a base of the mobile computing device is equal to a first threshold.

Example 29 includes the subject matter of any of Examples 17-28, and wherein determining whether the present physical configuration mode is the tent mode comprises determining whether the angle defined between the lid and the base is less than the first threshold and greater than a second threshold.

Example 30 includes the subject matter of any of Examples 17-29, and wherein determining whether the present physical configuration mode is the clamshell mode comprises determining whether the angle defined between the lid and the base is less than or equal to the second threshold.

Example 31 includes the subject matter of any of Examples 17-30, and wherein the first threshold is equal to about 360° and the second threshold is equal to about 180°.

Example 32 includes the subject matter of any of Examples 17-31, and wherein the body presence sensor comprises a capacitive sensor.

Example 33 includes a mobile computing device for calibrating a body presence sensor, the mobile computing device comprising a processor; and a memory having stored therein a plurality of instructions that when executed by the processor cause the mobile computing device to perform the method of any of Examples 17-32.

Example 34 includes one or more machine readable media comprising a plurality of instructions stored thereon that in response to being executed result in a mobile computing device performing the method of any of Examples 17-32.

Example 35 includes a mobile computing device for calibration of a body presence sensor, the mobile computing device comprising means for detecting, by a mode detection sensor of the mobile computing device, a change of a physical configuration mode of the mobile computing device; means for determining a present physical configuration mode of the mobile computing device in response to detecting the change of the physical configuration mode; and means for calibrating the body presence sensor of the mobile computing device based on the present physical configuration mode.

Example 36 includes the subject matter of Example 35, and further including means for turning off the body presence sensor in response to a determination that the present physical configuration mode is a clamshell mode.

Example 37 includes the subject matter of any of Examples 35 and 36, and further including means for detecting, by the body presence sensor, a body presence of a user within a proximity of the mobile computing device; wherein the means for calibrating the body presence sensor comprises means for recalibrating the body presence sensor based on the present physical configuration mode and detection of the body presence.

Example 38 includes the subject matter of any of Examples 35-37, and further including means for detecting, by the body presence sensor and subsequent to calibrating the body presence sensor, a body presence of a user within a proximity of the mobile computing device; means for determining a maximum transmit power level of a wireless communication circuit in response to detecting the body presence of the user; and means for controlling a transmit power level of the wireless communication circuit based on the maximum transmit power level.

Example 39 includes the subject matter of any of Examples 35-38, and further including means for determining whether the body presence is within a proximity threshold, wherein the means for controlling the transmit power level of the wireless communication circuit comprises means for reducing the transmit power level of the wireless communication circuit from a first transmit power level to a second transmit power level in response to a determination that the body presence being within the proximity threshold, wherein the second transmit power level is less than the first transmit power level.

Example 40 includes the subject matter of any of Examples 35-39, and wherein the means for determining whether the body presence is within the proximity threshold comprises means for determining whether the body presence is less than a maximum distance threshold from the body presence sensor.

Example 41 includes the subject matter of any of Examples 35-40, and wherein the means for determining whether the body presence is within the proximity threshold comprises means for determining whether the body presence is greater that a minimum distance threshold from the body presence sensor and less than the maximum distance threshold from the body presence sensor.

Example 42 includes the subject matter of any of Examples 35-41, and wherein the wireless communication circuit includes a wireless wide area network (WWAN) antenna.

Example 43 includes the subject matter of any of Examples 35-42, and wherein the means for detecting the change of the physical configuration mode comprises means for detecting a change of the physical configuration mode of the mobile computing device in response to detection of a power-on event of the mobile computing device.

Example 44 includes the subject matter of any of Examples 35-43, and wherein the means for detecting the change of the physical configuration mode comprises means for detecting a change of the physical configuration mode based on a sensor signal generated by an angle sensor of the mobile computing device, wherein the sensor signal is indicative of an angle defined between a lid of the mobile computing device and a base of the mobile computing device.

Example 45 includes the subject matter of any of Examples 35-44, and wherein the means for determining the present physical configuration mode comprises means for determining whether the present physical configuration mode of the mobile computing device is a tablet mode, a tent mode, or a clamshell mode.

Example 46 includes the subject matter of any of Examples 35-45, and wherein the means for determining whether the present physical configuration mode is the tablet mode comprises means for determining whether an angle defined between a lid of the mobile computing device and a base of the mobile computing device is equal to a first threshold.

Example 47 includes the subject matter of any of Examples 35-46, and wherein the means for determining whether the present physical configuration mode is the tent mode comprises means for determining whether the angle defined between the lid and the base is less than the first threshold and greater than a second threshold.

Example 48 includes the subject matter of any of Examples 35-47, and wherein the means for determining whether the present physical configuration mode is the clamshell mode comprises means for determining whether the angle defined between the lid and the base is less than or equal to the second threshold.

Example 49 includes the subject matter of any of Examples 35-48, and wherein the first threshold is equal to about 360° and the second threshold is equal to about 180°.

Example 50 includes the subject matter of any of Examples 35-49, and wherein the body presence sensor comprises a capacitive sensor.

The invention claimed is:

1. A mobile communication device comprising:
a mode detection sensor to generate sensor data indicative of a change of a physical configuration mode of the mobile communication device;
a physical configuration mode determination module to determine whether a present physical configuration mode of the mobile communication device is a tent mode, a tablet mode, or another mode in response to detection of the change of the physical configuration mode;
a body presence sensor to generate sensor data indicative of a presence of a body of a user within a maximum proximity threshold of the mobile communication device, wherein the maximum proximity threshold is greater than an in-physical-contact proximity of the mobile communication device;
a calibration module to calibrate the body presence sensor based on the present physical configuration mode, wherein the body presence sensor is to generate the sensor data as a result of the calibration; and
a communication power control module to reduce, subsequent to the calibration of the body presence sensor and in response to detection of a body presence of the user within the maximum proximity threshold of the mobile communication device and as a function of the present physical configuration mode, a transmit power level of a wireless communication circuit from a first transmit power level to a second transmit power level less than the first transmit power level,
wherein the calibration module is further configured to turn off the body presence sensor or ignore the sensor data generated by the body presence sensor in response to a determination that the present physical configuration mode is not the tent mode or the tablet mode.

2. The mobile communication device of claim 1, further comprising a body presence detection module to detect a body presence of the user within the maximum proximity threshold of the mobile communication device based on the sensor data,
wherein the calibration module is to calibrate the body presence sensor based on the present physical configuration mode and the detection of the body presence of the user within the maximum proximity threshold of the mobile communication device.

3. The mobile communication device of claim 1, wherein to determine whether the body presence is within the maximum proximity threshold comprises to determine whether the body presence is less than a maximum distance threshold from the body presence sensor.

4. The mobile communication device of claim 3, wherein to determine whether the body presence is within the maximum proximity threshold comprises to determine whether the body presence is greater than a minimum distance threshold from the body presence sensor and less than the maximum distance threshold from the body presence sensor.

5. The mobile communication device of claim 1, wherein to detect the change of the physical configuration mode comprises to detect a change of the physical configuration mode based on a sensor signal generated by an angle sensor of the mobile communication device, the sensor signal indicative of an angle defined between a lid of the mobile communication device and a base of the mobile communication device.

6. The mobile communication device of claim 1, wherein to determine the present physical configuration mode comprises to determine whether the present physical configuration mode of the mobile communication device is a tablet mode, a tent mode, or a clamshell mode.

7. The mobile communication device of claim 6, wherein to determine whether the present physical configuration mode is the tablet mode comprises to determine whether an angle defined between a lid of the mobile communication device and a base of the mobile communication device is equal to a first threshold.

8. The mobile communication device of claim 7, wherein to determine whether the present physical configuration mode is the tent mode comprises to determine whether the angle defined between the lid and the base is less than the first threshold and greater than a second threshold.

9. The mobile communication device of claim 8, wherein to determine whether the present physical configuration mode is the clamshell mode comprises to determine whether the angle defined between the lid and the base is less than or equal to the second threshold.

10. One or more non-transitory, machine-readable storage media comprising a plurality of instructions stored thereon that, in response to being executed cause a mobile communication device to:
detect a change of a physical configuration mode of the mobile communication device;

determine whether a present physical configuration mode of the mobile communication device is a tent mode, a tablet mode, or another mode in response to the change of the physical configuration mode being detected;

calibrate a body presence sensor of the mobile communication device based on the present physical configuration mode;

generate, by the body presence sensor, sensor data indicative of a presence of a body of a user within a maximum proximity threshold of the mobile communication device as a result of the calibration, wherein the proximity threshold is greater than an in-physical-contact proximity of the mobile communication device; and reduce, subsequent to the calibration of the body presence sensor and in response to detection of a body presence of the user within the maximum proximity threshold of the mobile communication device and as a function of the present physical configuration mode, a transmit power level of a wireless communication circuit from a first transmit power level to a second transmit power level less than the first transmit power level, wherein to calibrate the body presence sensor comprises to turn off the body presence sensor or ignore the sensor data generated by the body presence sensor in response to a determination that the present physical configuration mode is not the tent mode or the tablet mode.

11. The one or more non-transitory, machine-readable storage media of claim 10, wherein the plurality of instructions further cause the mobile communication device to:

detect a body presence of the user within the maximum proximity threshold of the mobile communication device;

wherein to calibrate the body presence sensor comprises to recalibrate the body presence sensor based on the present physical configuration mode and detection of the body presence.

12. The one or more non-transitory, machine-readable storage media of claim 10, wherein to determine whether the body presence is within the maximum proximity threshold comprises to determine whether the body presence is less than a maximum distance threshold from the body presence sensor.

13. The one or more non-transitory, machine-readable storage media of claim 12, wherein to determine whether the body presence is within the maximum proximity threshold comprises to determine whether the body presence is greater than a minimum distance threshold from the body presence sensor and less than the maximum distance threshold from the body presence sensor.

14. The one or more non-transitory, machine-readable storage media of claim 10, wherein to detect the change of the physical configuration mode comprises to detect a change of the physical configuration mode based on a sensor signal generated by an angle sensor of the mobile communication device, wherein the sensor signal is indicative of an angle defined between a lid of the mobile communication device and a base of the mobile communication device.

15. The one or more non-transitory, machine-readable storage media of claim 10, wherein to determine the present physical configuration mode comprises to determine whether the present physical configuration mode of the mobile communication device is a tablet mode, a tent mode, or a clamshell mode.

16. The one or more non-transitory, machine-readable storage media of claim 15, wherein to determine whether the present physical configuration mode is the tablet mode comprises to determine whether an angle defined between a lid of the mobile communication device and a base of the mobile communication device is equal to a first threshold.

17. The one or more non-transitory, machine-readable storage media of claim 16, wherein to determine whether the present physical configuration mode is the tent mode comprises to determine whether the angle defined between the lid and the base is less than the first threshold and greater than a second threshold.

18. The one or more non-transitory, machine-readable storage media of claim 17, wherein to determine whether the present physical configuration mode is the clamshell mode comprises to determine whether the angle defined between the lid and the base is less than or equal to the second threshold.

19. A method comprising:

detecting, by a mode detection sensor of a mobile communication device, a change of a physical configuration mode of the mobile communication device;

determining, by the mobile communication device, whether a present physical configuration mode of the mobile communication device is a tent mode, a tablet mode, or another mode in response to detecting the change of the physical configuration mode;

calibrating a body presence sensor of the mobile communication device based on the present physical configuration mode;

generating, by the body presence sensor, sensor data indicative of a presence of a body of a user within a maximum proximity threshold of the mobile communication device as a result of the calibration, wherein the proximity threshold is greater than an in-physical-contact proximity of the mobile communication device; and reducing, subsequent to the calibration of the body presence sensor and in response to detection of a body presence of the user within the maximum proximity threshold of the mobile communication device and as a function of the present physical configuration mode, a transmit power level of a wireless communication circuit from a first transmit power level to a second transmit power level less than the first transmit power level, wherein calibrating the body presence sensor comprises turning off the body presence sensor or ignoring the sensor data generated by the body presence sensor in response to determining that the present physical configuration mode is not the tent mode or the tablet mode.

20. The method of claim 19, further comprising:

detecting, by the body presence sensor, a body presence of the user within the maximum proximity threshold of the mobile communication device based on the sensor data;

wherein calibrating the body presence sensor comprises recalibrating the body presence sensor based on the present physical configuration mode and detection of the body presence.

* * * * *